US012443520B2

(12) United States Patent
Yadav et al.

(10) Patent No.: US 12,443,520 B2
(45) Date of Patent: Oct. 14, 2025

(54) DYNAMIC WORD LINE ALLOCATION IN MEMORY SYSTEMS

(71) Applicant: Micron Technology, Inc., Boise, ID (US)

(72) Inventors: Tarun Singh Yadav, Boise, ID (US); Scott Anthony Stoller, Boise, ID (US); Pitamber Shukla, San Jose, CA (US); Fulvio Rori, Boise, ID (US); Attila A. Herrera, Boise, ID (US); Justin Bates, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/417,517

(22) Filed: Jan. 19, 2024

(65) Prior Publication Data

US 2024/0249789 A1 Jul. 25, 2024

Related U.S. Application Data

(60) Provisional application No. 63/443,841, filed on Feb. 7, 2023, provisional application No. 63/440,834, filed on Jan. 24, 2023.

(51) Int. Cl.
*G06F 12/02* (2006.01)
*G11C 29/12* (2006.01)

(52) U.S. Cl.
CPC ...... *G06F 12/0246* (2013.01); *G11C 29/1201* (2013.01); *G06F 2212/1036* (2013.01); *G11C 2029/1202* (2013.01)

(58) Field of Classification Search
CPC ........ G11C 29/1201; G11C 2029/1202; G11C 29/4401; G11C 29/76; G11C 2212/1036; G11C 12/0246
See application file for complete search history.

(56) References Cited

U.S. PATENT DOCUMENTS 5,606,528 A * 2/1997 Ikeda ............... G11C 29/34
365/230.01
9,348,708 B2 * 5/2016 Jung ............... G11C 29/76
(Continued)

FOREIGN PATENT DOCUMENTS

CN 112463053 A * 3/2021 ........... G06F 3/0604
WO WO-2020227294 A1 * 11/2020 ......... G06F 12/0246
WO 2024158647 8/2024

OTHER PUBLICATIONS

"International Application Serial No. PCT US2024 012154, International Search Report mailed May 9, 2024", 3 pages.
(Continued)

*Primary Examiner* — Steve N Nguyen
(74) *Attorney, Agent, or Firm* — Schwegman Lundberg & Woessner, P.A.

(57) ABSTRACT

Aspects of the present disclosure configure a memory subsystem controller to adaptively allocate word lines (WLs). The controller accesses reliability data of a set of main WLs of a block of the set of memory components. The controller determines that one or more WLs of the set of main WLs of the block are associated with respective reliability data that transgress a threshold and, in response to determining that the one or more WLs are associated with the respective reliability data that transgress the threshold, replaces the one or more WLs of the set of main WLs of the block with one or more dummy WLs. The controller programs data into the block using the one or more dummy WLs instead of the one or more WLs of the set of main WLs of the block.

20 Claims, 6 Drawing Sheets

(56) References Cited

U.S. PATENT DOCUMENTS

| | | | |
|---|---|---|---|
| 9,934,858 B2* | 4/2018 | Yang | G11C 11/5628 |
| 9,959,164 B2* | 5/2018 | Park | G11C 29/52 |
| 10,055,267 B2* | 8/2018 | Agarwal | G11C 29/08 |
| 10,209,914 B2* | 2/2019 | Agarwal | G11C 16/0483 |
| 2001/0053086 A1 | 12/2001 | Aritomi et al. | |
| 2008/0043780 A1* | 2/2008 | Kobayashi | G11C 29/24 370/506 |
| 2008/0273388 A1 | 11/2008 | Chin et al. | |
| 2012/0014197 A1 | 1/2012 | Okuma | |
| 2015/0228352 A1* | 8/2015 | Choi | G11C 29/76 365/185.2 |
| 2017/0084352 A1* | 3/2017 | Park | G11C 29/44 |
| 2017/0098478 A1* | 4/2017 | Lee | G11C 16/26 |
| 2017/0213599 A1 | 7/2017 | Reusswig et al. | |
| 2022/0076753 A1* | 3/2022 | Sharma | G11C 16/3459 |

OTHER PUBLICATIONS

"International Application Serial No. PCT US2024 012154, Written Opinion mailed May 9, 2024", 4 pages.

* cited by examiner

DYNAMIC WORD LINE ALLOCATION IN MEMORY SYSTEMS

PRIORITY APPLICATION

This application claims the benefit of priority to U.S. Provisional Application Ser. No. 63/440,834, filed Jan. 24, 2023 and to U.S. Provisional Application Ser. No. 63/443,841, filed Feb. 7, 2023, all of which are incorporated herein by reference in their entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
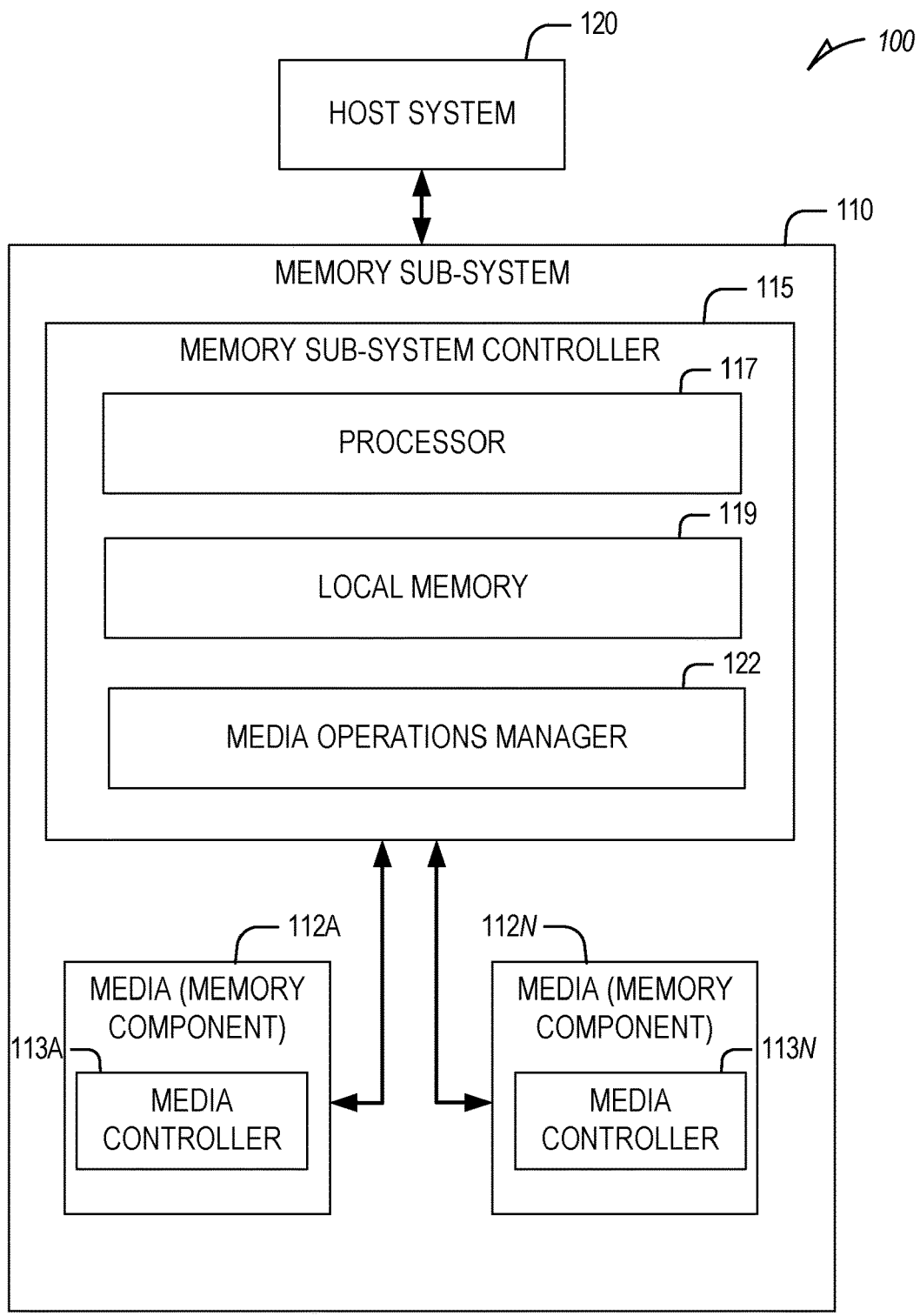
FIG. 1 is a block diagram illustrating an example computing environment including a memory sub-system, in accordance with some embodiments of the present disclosure.

Aspects of the present disclosure configure a system component, such as a memory sub-system controller, to perform adaptive WL allocation operations. The memory sub-system controller can identify one or more WLs of a block that have reliability measures or data that transgress a threshold (e.g., WLs that have poor data retention and poor reliability). Such WLs can be defective or can be close to reaching the end of life (EOL). Rather than discarding the block to prevent further storage to the block, the controller can replace the one or more WLs with dummy WLs (e.g., WLs that are not associated with any blocks for storing data during device manufacture). These dummy WLs are WLs that are physically on edges of the memory device or interface portions of the memory device which are usually associated with shorter life cycles than main WL. Because such dummy WLs are usually not as reliable as the main WLs, they are not associated with storage of data when computing the memory device capacity. However, such dummy WL can be temporarily swapped in when one or more of the main WLs of a block reach the EOL or have poor data retention to avoid discarding the block entirely (e.g., to avoid preventing storage to the block in the entirety) and can prolong the lifetime of the block and memory device. This ensures that performance of the memory system remains optimal and improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

There are challenges in efficiently managing or performing media management operations on typical memory devices. Specifically, certain memory devices, such as NAND flash devices, include large die-by-die reliability (RWB) and block-by-block reliability variation. As the technology for such memory devices continues to be scaled down, this die-by-die reliability and block-by-block reliability variation becomes more pronounced and problematic in performing memory management. Current memory systems (e.g., SSD drive or die package systems) associate all of the memory devices in the memory system with a certain reliability specification. In some cases, each block or WL of each block of each memory device is associated with a reliability metric, measure, data, grade or specification which is used to determine whether the block or WL is a good or bad. The reliability metric, measure, data, grade or specification can be set at manufacture or during operation of the memory devices, such as by measuring the data retention and/or error rate associated with particular blocks and WL.

During operation, cells/WLs within a block can become non-functional due to defectivity or general degradation and wear-out through program-erase cycling (PEC). In addition, some WLs are more likely to suffer from wear-out more quickly than other WLs due to physical properties of the WLs. In addition, high-density quad level cell storage (QLC) systems utilize a forced single level cell (SLC) cache system. This system uses direct-to-SLC writes followed by folding SLC blocks into QLC blocks. Proper SSD design may consider a balance of SLC blocks to QLC blocks such that the blocks allocated for SLC caching do not reach end-of-life (EOL), from a reliability standpoint, before the QLC region does. The forced SLC caching area can be very small compared to the QLC area because QLC blocks have 4× higher density than SLC (4 bit-per-cell vs. 1 bit-per-cell) and for system overprovisioning optimization. Because of this, the SLC area can be exposed to extremely high PEC counts compared to the QLC blocks. Conventional QLC storage systems write host data directly to the SLC cache area before folding to QLC. Due to the 4:1 block density difference and small number of blocks allocated for SLC, extremely high PEC requirements are placed on the SLC region. At SLC block EOL, block retirement due to cycling is driven by the set of weakest WLs, while some WLs are still able to meet data reliability requirements. Particularly, conventional systems can end up retiring blocks preventing further storage to such blocks prematurely (e.g., while there may still exist WLs and cells that can reliably store data). This reduces the quality of the memory devices and reduces the storage capacity of such devices sooner than needed. This results in waste of system resources and increased cost as new memory devices may need to be obtained to replace prematurely retired memory devices.

Typical memory devices have dummy WLs at the top, bottom, and center interface, that are not used for data storage. Aspects of the present disclosure address the above and other deficiencies by utilizing the dummy WLs to replace or augment the WLs that are determined to have poorer reliability than other WLs of a block. Specifically, the disclosed controller switches out broken/defective WLs, or WLs that are worn out, with fresh dummy WLs to preserve the full functional capacity of a block and reduce the occurrence rate of grown bad blocks. Also, the disclosed controller can use the most capable WLs (e.g., WLs having reliability metrics or data that meet a reliability threshold which are still capable of reliability storing data without reaching a threshold error rate) in the SLC block as the block exceeds the PEC endurance rating. This enables smaller SLC caching area (increased system overprovisioning) to improve system block management. In this way, the disclosed controller extends PEC capability for SLC blocks by using dummy WLs for data storage as a mechanism to improve reliability.

For example, the memory controller can access reliability data of a set of main word lines (WLs) of a block of the set of memory components and determine that one or more WLs of the set of main WLs of the block are associated with respective reliability data that transgress a threshold. In response to determining that the one or more WLs are associated with the respective reliability data that transgress the threshold, the memory controller replaces the one or more WLs of the set of main WLs of the block with one or more dummy WLs and programs data into the block using the one or more dummy WLs instead of the one or more WLs of the set of main WLs of the block.

In some examples, the reliability data includes an error rate associated with the set of main WLs of the block. In some cases, the threshold represents a tolerable error rate. In some examples, the memory controller determines that the one or more WLs are associated with respective reliability data that transgress the threshold by determining that the one or more WLs fail a verify stage of a programming cycle. In some examples, the one or more WLs correspond to defective WLs.

In some examples, the one or more dummy WLs are selected from a group of WLs that are initially unmapped to any blocks of the set of memory components during manufacture of the memory sub-system. In some examples, the one or more dummy WLs are physically positioned at a top portion, bottom portion, edge portion, or interface portion of the memory sub-system.

In some examples, the memory controller alternatively cycles between programming data to the block using the one or more WLs that are associated with respective reliability data that transgress the threshold, and the one or more dummy WLs. In some examples, the memory controller determines that a quantity of program-erase cycles of the one or more WLs corresponds to a criterion. In response to determining that the quantity of program-erase cycles of the one or more WLs corresponds to the criterion, the memory controller programs the data to the block using the one or more WLs. In some cases, in response to determining that the quantity of program-erase cycles of the one or more WLs fail to correspond to the criterion, the memory controller programs the data to the block using the one or more dummy WLs. In some examples, the criterion includes an even number or odd number.

In some examples, the block corresponds to a single level cell block. In some examples, the memory controller updates a page map that identifies WLs of the block to include the one or more dummy WLs. In some examples, the page map corresponds to a single level cell (SLC) page map. In such cases, the memory controller updates a quad level cell (QLC) page or block map corresponding to the SLC page map. In some examples, the memory controller combines a remaining portion of the set of main WLs for which the respective reliability data fail to transgress the threshold to form an individual SLC block and generates a QLC block that includes a plurality of SLC blocks including the individual SLC block.

In some examples, the memory controller determines that the QLC block is incompletely filled by the plurality of SLC blocks in response to determining that the individual SLC block includes a quantity of WLs that is fewer than a total number of WLs in the set of main WLs. In response to determining that the QLC block is incompletely filled, the memory controller adds an additional SLC block into the QLC block.

In some aspects, the memory controller determines that the QLC block is incompletely filled by the plurality of SLC blocks in response to determining that the individual SLC block includes a quantity of WLs that is fewer than a total number of WLs in the set of main WLs. In response to determining that the QLC block is incompletely filled, the memory controller adds dummy data to incompletely filled portions of the QLC block.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A, block, WL, or page of the first memory component 112A, or group of memory components including the first memory component 112A, can be associated with a reliability (capability) grade, data, metric, value, or measure. The terms "reliability grade," "reliability metric, "reliability data," "reliability value" and "reliability measure" are used interchangeably throughout and can have the same meaning. The reliability data can indicate whether the block, WL, or page of the first memory component 112A can reliably store or program data. In some cases, the reliability data can represent a bit error rate (BER) of the block, WL, or page of the first memory component 112A. In some cases, the reliability data can represent a current PEC count of the block, WL, or page of the first memory component 112A. In some examples, a memory or register can be associated with all of the memory components 112A to 112N which can store a table that maps different groups, bins, WLs, blocks, and/or sets of the memory components 112A to 112N to respective reliability data.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing devices that include a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

In some cases, the controller 115 can initially store or program data to multiple SLC blocks of the memory components 112A to 112N. Then, at a later time, the controller 115 can fold multiple SLC blocks to which data has been programmed (e.g., 4 blocks) into a single QLC storage block. Because the QLC blocks are programmed fewer times than the SLC blocks, the QLC blocks can be associated with a lower PEC count than the SLC blocks.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the reliability grades associated with different groups of the memory components 112N to 112N and/or different blocks within each of the memory components 112N to 112N. In some cases, the reliability grades are dynamic and can be updated by the memory sub-system controller 115 during operation of the memory sub-system 110 in response to determining that certain error rates are reached that transgress an error rate threshold (e.g., a reliability threshold). For example, a good WL can become a bad WL if that good WL starts having error rates that transgress the reliability threshold. In such cases, the configuration data is updated and any block stripe that includes that now bad WL is designated as a short block stripe.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N, as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to accesses reliability data of a set of main WLs of a block of the set of memory components. The media operations manager 122 determines that one or more WLs of the set of main WLs of the block are associated with respective reliability data that transgress a threshold and, in response to determining that the one or more WLs are associated with the respective reliability data that transgress the threshold, replaces the one or more WLs of the set of main WLs of the block with one or more dummy WLs. The media operations manager 122 programs data into the block using the one or more dummy WLs instead of the one or more WLs of the set of main WLs of the block.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
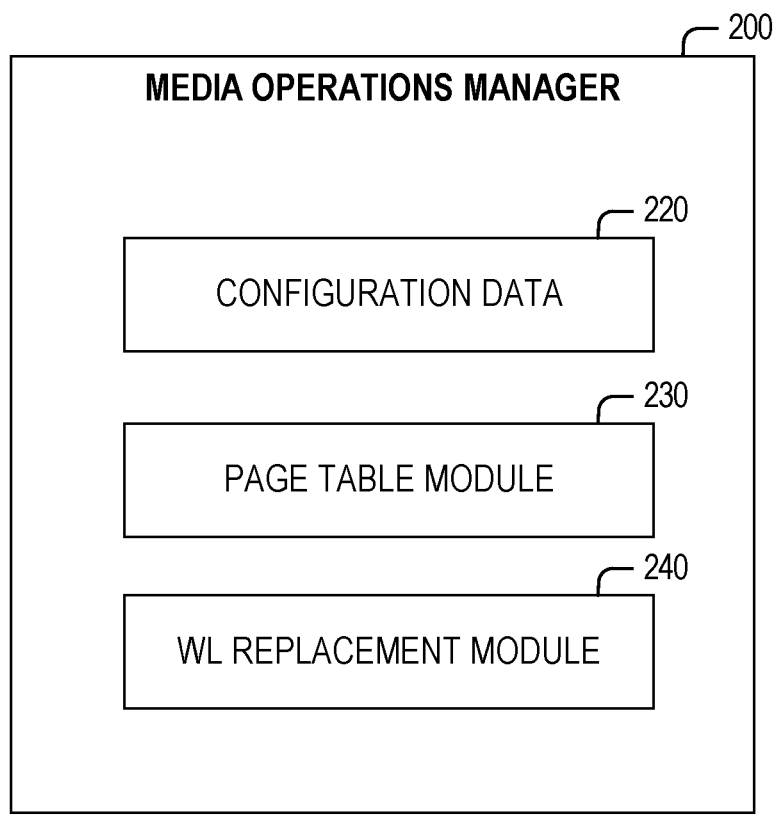
FIG. 2 is a block diagram of an example media operations manager, in accordance with some implementations of the present disclosure.

FIG. 2 is a block diagram of an example media operations manager 200 (which represents the media operations manager 122 of FIG. 1), in accordance with some implementations of the present disclosure. As illustrated, the media operations manager 122 includes configuration data 220, a page table module 230, and a WL replacement module 240. For some embodiments, the media operations manager 122 can differ in components or arrangement (e.g., less, or more components) from what is illustrated in FIG. 2.

The configuration data 220 accesses and/or stores configuration data associated with the memory components 112A to 112N of FIG. 1. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including reliability grades of different bins, groups, blocks, WLs, indication of dummy WLs, block stripes, and/or sets of the memory components 112A to 112N. The media operations manager 122 receives configuration data from the host system 120 and stores the configuration data in the configuration data 220.

In some examples, the media operations manager 122 performs one or more test operations on different WLs, groups, or blocks of the memory components 112A to 112N. The test operations are configured to determine reliability of each block of the memory components 112A to 112N. Based on a result of the test operations, the media operations manager 122 can store or update the reliability grades stored in the configuration data 220 for the different groups or blocks of memory components 112A to 112N. In some examples, the media operations manager 122 can periodically or routinely perform the test operations.

For example, the media operations manager 122 can program data to a block that includes a plurality of main WLs. The media operations manager 122 can read the programmed data from the block to verify proper storage of the data. Based on performing the verification, the media operations manager 122 can identify one or more WLs of the main WLs that have poor or reliability measures or grades that are below a threshold. For example, the media operations manager 122 can determine that the one or more WLs of the main WLs of the block are defective and/or have poor data retention and/or have an error rate that transgresses an error rate threshold. In such cases, the media operations manager 122 communicates the identity of these affected WLs to the WL replacement module 240. The WL replacement module 240 can then communicate with the page table module 230 to replace the affected WLs with one or more dummy WLs. This ensures that the storage reliability of the block that includes the WLs with the poor reliability measure can optimally store data using the dummy WLs instead of the affected main WLs.

In some examples, the media operations manager 122 alternatively cycles between programming data to the block using the one or more WLs that are associated with respective reliability data that transgress the threshold and the one or more dummy WLs. Specifically, the media operations manager 122 can communicate with the configuration data 220 to determine a PEC count of the WLs having the reliability grade that is below a threshold. In response to receiving a request to program data to the block that includes the WLs with the reliability grade below the threshold, the media operations manager 122 can determine if the PEC count of the WLs of the block corresponds to a criterion. For example, the media operations manager 122 can determine if the current PEC count of the WLs is even. In response to determining that the PEC count of the WLs is even, the media operations manager 122 can store or program data to the block using the main WLs that include those WLs with the reliability grade that is below the threshold. For example, the media operations manager 122 can determine if the current PEC count of the WLs is odd. In response to determining that the PEC count of the WLs is odd (or not even), the media operations manager 122 can store or program data to the block using the dummy WLs instead of the main WLs with the reliability grade that is below the threshold. This reduces the number of PECs that the main WLs are exposed to using the dummy WLs.

In some examples, the media operations manager 122 can perform a specified quantity (e.g., four) PEC cycles on the main WL. After performing the specified quantity of PEC cycles on the main WL, the media operations manager 122 can then substitute the main WL with a dummy WL. In some cases, in addition or alternative to the specified quantity of PEC cycles, the media operations manager 122 can begin using dummy WLs after a threshold time period from when the main WL have been used has elapsed, and/or after a reliability threshold is reached, and/or when a PEC cycle threshold has been reached. After performing another quantity (e.g., 1) PEC cycle on the dummy WL, the media operations manager 122 returns to programming the data on the main WL until the specified quantity (e.g., four) PEC cycles is reached.

In some cases, rather than being even or odd, the criterion can correspond to a modulo operator. In such cases, the media operations manager 122 can compute a modulo of the current PECs of the main WLs and can selectively and alternatively cycle between using the main WLs to program data to the block and using the dummy WLs to program data to the block.

In some examples, the main WLs may be cycled out to EOL for the weakest main WLs, and then the dummy WLs (e.g., edge WLs) are used at the EOL. This allows most main WLs (which are capable of more endurance than the worst-case main WLs) to continue to be utilized without adversely impacting the size of the block. In some cases, a defect is encountered during normal system operation. System error handling and recovery can find that only 1 or 2 WLs are impacted by the defect. The media operations manager 122 can continue to use this block by skipping the defective WLs and using the readily available dummy WLs instead, preventing the creation of a new block and preserving crucial overprovisioning on the system.

In some cases, the media operations manager 122 can determine that the quantity of main WLs that are failing (e.g., have fallen below a reliability threshold) exceeds the quantity of available dummy WLs. In such cases, the media operations manager 122 can change the SLC page table or page map to reduce the number of WLs in the SLC block. In some cases, the media operations manager 122 can determine that all of the dummy WLs have been used and there is still a failure in the SLC bloc. In such cases, the media operations manager 122 can change the SLC page table or page map to reduce the number of WLs in the SLC block.

In some examples, to get the dummy WLs to properly erase and program, the bias applied to the dummy WL is changed to match the edge main WLs bias.

Figure 3:
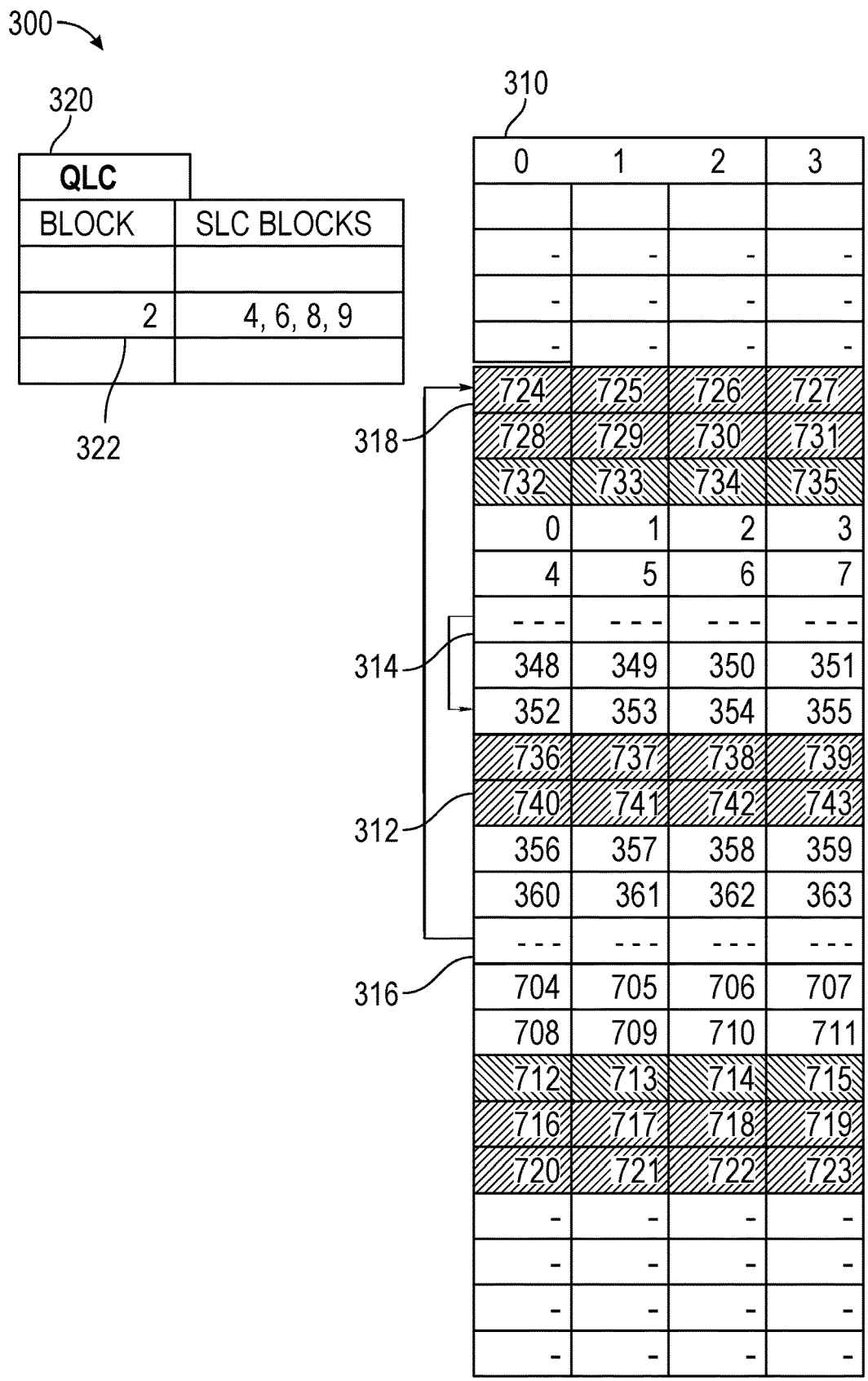
FIG. 3 is a block diagram of example page tables, in accordance with some implementations of the present disclosure.

For example, as shown in FIG. 3, the page table module 230 of FIG. 2 maintains two or more page tables, such as a QLC block table 320 (or MLC or TLC table) and an SLC page table 310. The QLC block table 320 identifies which SLC blocks are identified or correspond to a particular QLC block 322. Specifically, the QLC block 322 can correspond to or store data for multiple SLC blocks that are in the SLC page table 310.

The page table module 230 also maintains and tracks which WLs (e.g., rows in the SLC page table 310) of a given SLC block are used to form the given SLC block. The page addresses of each SLC block are shown in the contents of each cell in the SLC page table 310. The cells that are shaded in the SLC page table 310 represent pages that are located on dummy WLs. Cells that are empty are represented by '-' which can be dummy WLs that are not capable of being cycled or are used as selected gates. The cells with the '---' symbol represent additional WLs between the WLs of the SLC blocks.

For example, the media operations manager 122 of FIG. 1 can, at one point in time, select the dummy WL 318 or main WL 312 to store or program data for the SLC block. At another time, the media operations manager 122 can select one or more dummy WLs 314 and 316 to use in place of the dummy WL 318 and/or main WL 312. The page table module 230 can also maintain or store the corresponding reliability grade of each WL and the reliability threshold against which the reliability grade of each main WL is tested or compared to determine whether to use a dummy WL in replacement of the main WL. Specifically, the media operations manager 122 can substitute dummy WLs with other dummy WLs and/or can substitute main WL with dummy WLs.

In some examples, the media operations manager 122 combines a portion of the set of main WLs for which the respective reliability grades transgress the threshold to form an individual SLC block. Particularly, the media operations manager 122 can identify which main and/or dummy WLs of the individual SLC block are considered reliable (e.g., have a reliability grade that transgresses a threshold or have error rates below an error rate threshold). The media operations manager 122 can then from an SLC block based on the identified main and/or dummy WLs which can be less than the main set of WLs that are pre-associated, at manufacture, with the SLC block. In some cases, the WLs that are used to form the SLC block are less than a specified quantity used to form other SLC blocks. In such cases, when such an SLC block is combined with other SLC blocks that have the specified quantity of WLs, and when these combined SLC blocks are folded into a QLC block, the corresponding QLC block is incompletely filled.

In such cases, media operations manager 122 determines that the QLC block is incompletely filled by the plurality of SLC blocks in response to determining that the individual SLC block includes a quantity of WLs that is fewer than a total number of WLs in the set of main WLs. In response to determining that the QLC block is incompletely filled, the media operations manager 122 identifies WLs of an additional SLC block to add into the QLC block.

In some examples, the media operations manager 122 determines that the QLC block is incompletely filled by the plurality of SLC blocks in response to determining that the individual SLC block includes a quantity of WLs that is fewer than a total number of WLs in the set of main WLs. In response to determining that the QLC block is incompletely filled, the media operations manager 122 adds dummy data to incompletely filled portions of the QLC block.

Figure 4:
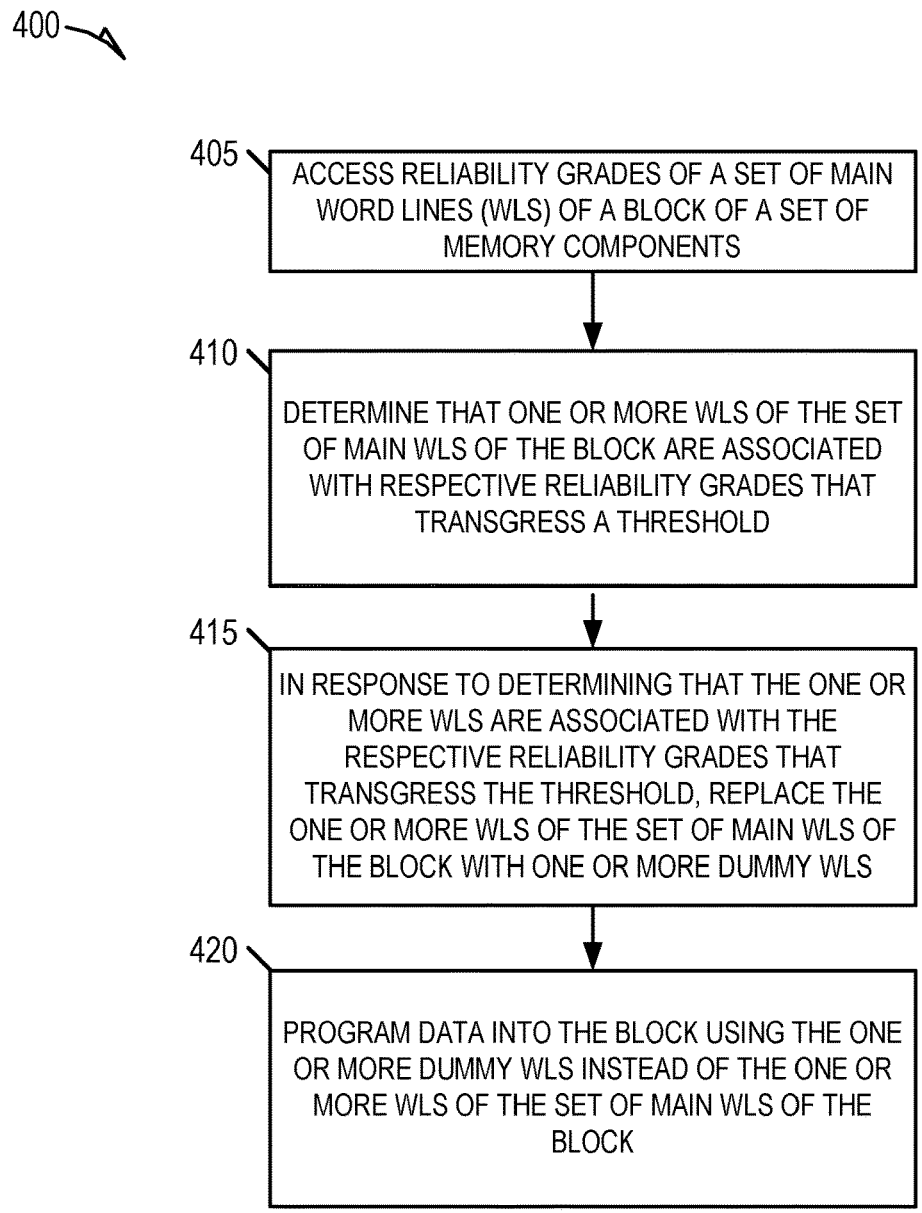
FIGS. 4 and 5 are flow diagrams of example methods to perform dynamic world line (WL) allocation, in accordance with some implementations of the present disclosure.

FIG. 4 is a flow diagram of an example method 400 to adaptively allocate WLs of a block, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a media operations manager 122 of a memory sub-system (e.g., memory sub-system 110) accessing reliability data of a set of main WLs of a block of the set of memory components. Then, at operation 410, the media operations manager 122 of the memory sub-system determines that one or more WLs of the set of main WLs of the block are associated with respective reliability data that transgress a threshold. Thereafter, at operation 415, the media operations manager 122, in response to determining that the one or more WLs are associated with the respective reliability data that transgress the threshold, replaces the one or more WLs of the set of main WLs of the block with one or more dummy WLs. The media operations manager 122, at operation 420 programs data into the block using the one or more dummy WLs instead of the one or more WLs of the set of main WLs of the block.

Figure 5:
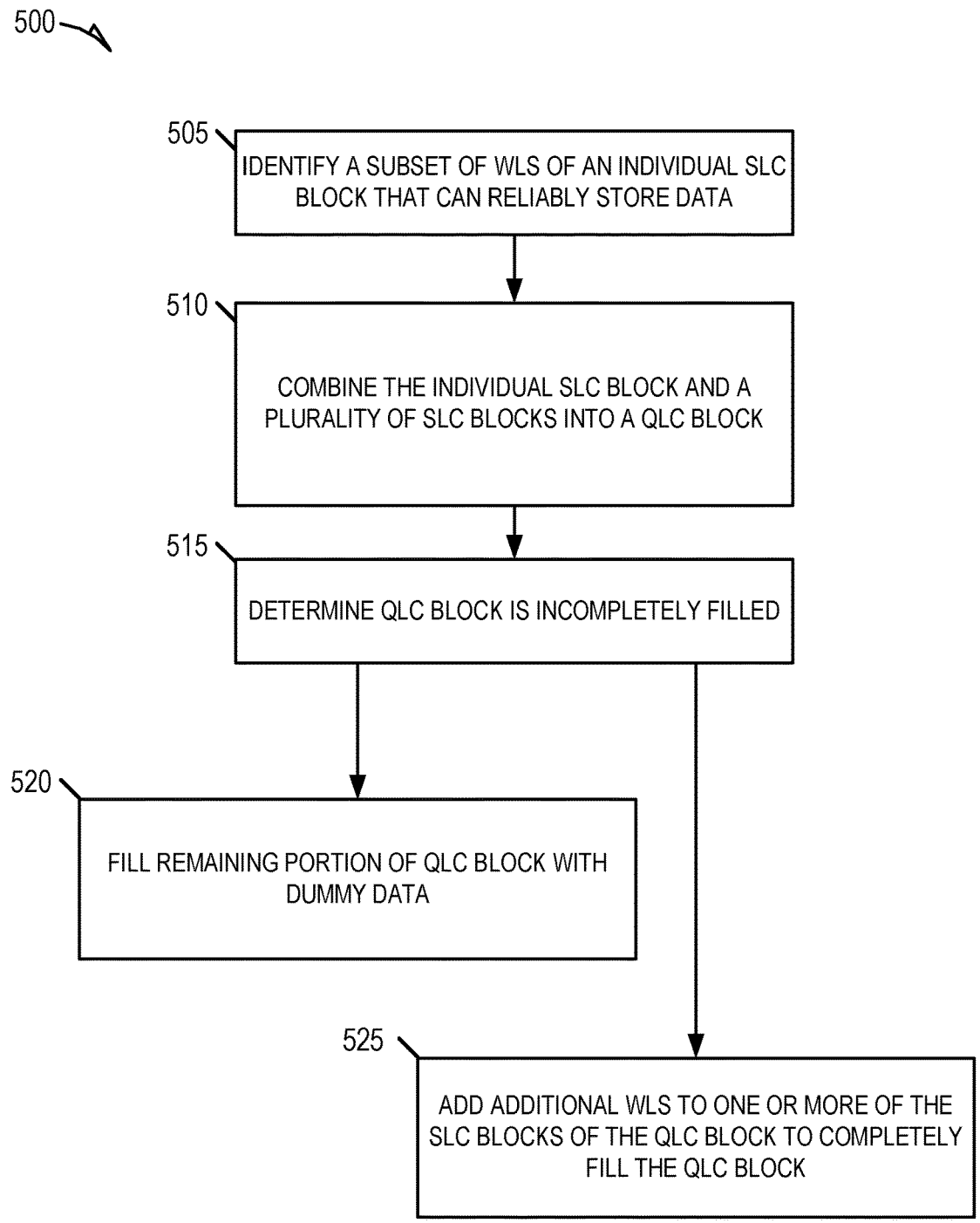

FIG. 5 is a flow diagram of an example method 50 to adaptively allocate WLs of a block, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 5, the method (or process) 500 begins at operation 505, with a media operations manager 122 of a memory sub-system (e.g., memory sub-system 110) identifying a subset of WLs of an individual SLC block that can reliably store data. At operation 510, the media operations manager 122 combines the individual SLC block and a plurality of SLC blocks into a QLC block and, at operation 515, determines if the QLC block is completely or incompletely filled. If the QLC block is incompletely filled, the media operations manager 122, at operation 520, fills the remaining portion of the QLC block (which is not filled) with dummy data. In addition, or alternatively, at operation 525 the media operations manager 122 identifies (e.g., computes) additional WLs of one or more of the SLC blocks to add to the QLC block to completely fill the QLC block.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: accessing reliability data of a set of main word lines (WLs) of a block of the set of memory components; determining that one or more WLs of the set of main WLs of the block are associated with respective reliability data that transgress a threshold; in response to determining that the one or more WLs are associated with the respective reliability data that transgress the threshold, replacing the one or more WLs of the set of main WLs of the block with one or more dummy WLs; and programing data into the block using the one or more dummy WLs instead of the one or more WLs of the set of main WLs of the block.

Example 2. The system of Example 1, wherein the reliability data comprises an error rate associated with the set of main WLs of the block.

Example 3. The system of Example 2, wherein the threshold represents a tolerable error rate.

Example 4. The system of any one of Examples 1-3, wherein determining that the one or more WLs are associated with respective reliability data that transgress the threshold comprises determining that the one or more WLs fail a verify stage of a programming cycle.

Example 5. The system of Example 4, wherein the one or more WLs correspond to defective WLs.

Example 6. The system of any one of Examples 1-5, wherein the one or more dummy WLs are selected from a group of WLs that are initially unmapped to any blocks of the set of memory components during manufacture of the memory sub-system.

Example 7. The system of Example 6, wherein the one or more dummy WLs are physically positioned at a top portion, bottom portion, edge portion, or interface portion of the memory sub-system.

Example 8. The system of any one of Examples 1-7, the operations comprising: alternatively cycling between programming data to the block using the one or more WLs that are associated with respective reliability data that transgress the threshold and the one or more dummy WLs.

Example 9. The system of Example 8, the operations comprising: determining that a quantity of program-erase cycles of the one or more WLs corresponds to a criterion; and in response to determining that the quantity of program-erase cycles of the one or more WLs corresponds to the criterion, programming the data to the block using the one or more WLs.

Example 10. The system of Example 9, the operations comprising: in response to determining that the quantity of program-erase cycles of the one or more WLs fail to correspond to the criterion, programming the data to the block using the one or more dummy WLs.

Example 11. The system of any one of Examples 9-10, wherein the criterion comprises at least one of an even number WL; an odd number WL; a threshold quantity of program cycles being performed; an elapsed time of use; a reliability threshold being reached; or a specified quantity of program-erase cycles being reached.

Example 12. The system of any one of Examples 1-11, wherein the block corresponds to a single level cell block.

Example 13. The system of any one of Examples 1-12, the operations comprising: updating a page map that identifies WLs of the block to include the one or more dummy WLs.

Example 14. The system of Example 13, wherein the page map corresponds to a single level cell (SLC) page map, the operations comprising: updating a quad level cell (QLC) page or block table corresponding to the SLC page map.

Example 15. The system of Example 14, the operations comprising: combining a remaining portion of the set of main WLs for which the respective reliability data fail to transgress the threshold to form an individual SLC block; and generating a QLC block that includes a plurality of SLC blocks comprising the individual SLC block.

Example 16. The system of Example 15, the operations comprising: determining that the QLC block is incompletely filled by the plurality of SLC blocks in response to determining that the individual SLC block includes a quantity of WLs that is fewer than a total number of WLs in the set of main WLs.

Example 17. The system of Example 16, the operations comprising: in response to determining that the QLC block is incompletely filled, adding an additional SLC block into the QLC block.

Example 18. The system of any one of Examples 17, the operations comprising: determining that the QLC block is incompletely filled by the plurality of SLC blocks in response to determining that the individual SLC block includes a quantity of WLs that is fewer than a total number of WLs in the set of main WLs; and in response to determining that the QLC block is incompletely filled, adding dummy data to incompletely filled portions of the QLC block.

Methods and computer-readable storage medium with instructions for performing any one of the above examples.

Figure 6:
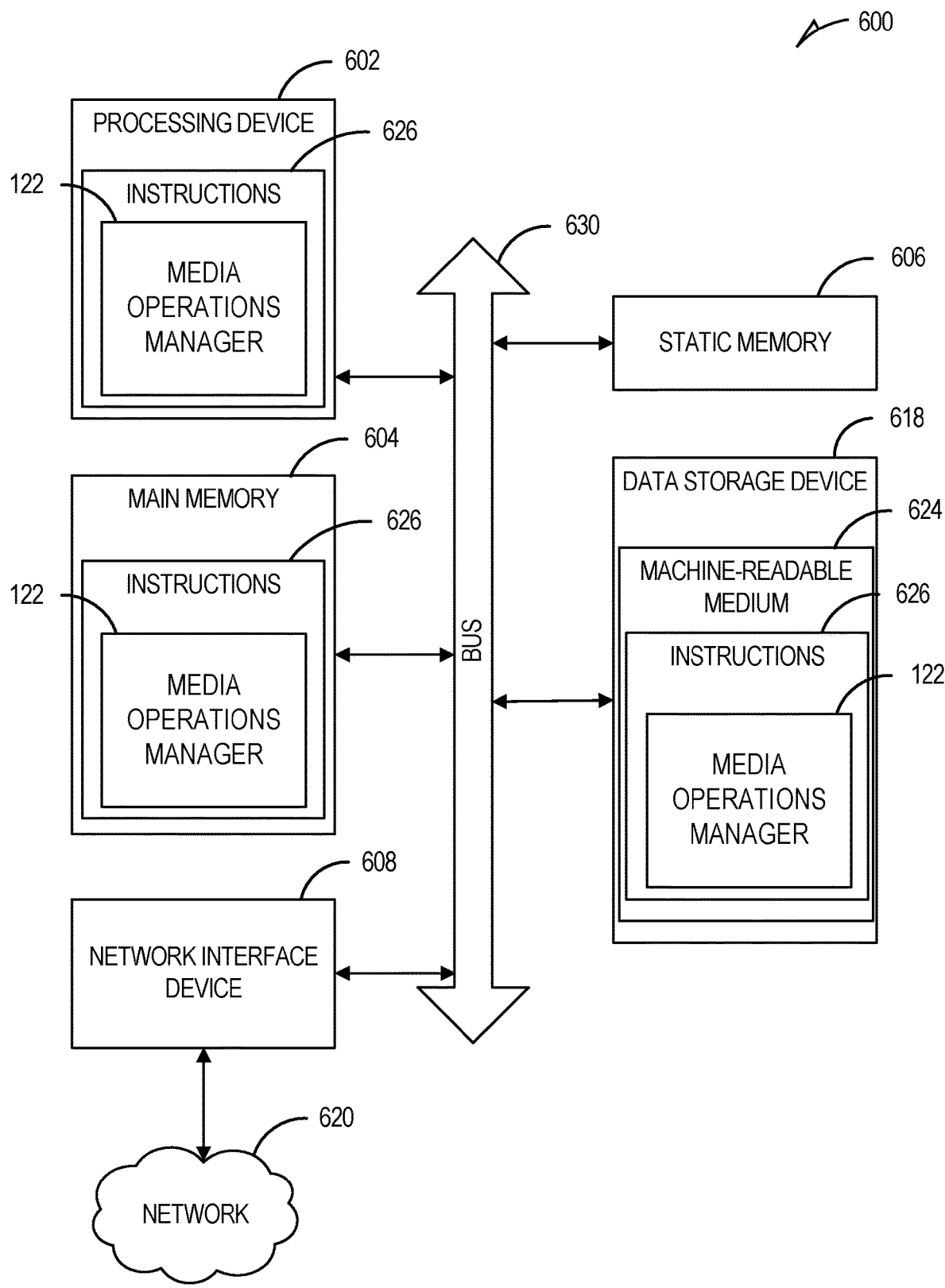
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways those skilled in the data processing arts effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a set of memory components of a memory sub-system; and
a processing device operatively coupled to the set of memory components, the processing device being configured to perform operations comprising:
accessing reliability data of a set of main word lines (WLs) of a block of the set of memory components;

determining that one or more WLs of the set of main WLs of the block are associated with respective reliability data that transgress a threshold;

in response to determining that the one or more WLs are associated with the respective reliability data that transgress the threshold, replacing the one or more WLs of the set of main WLs of the block with one or more dummy WLs; and alternatively cycling between programming data to the block using the one or more WLs that are associated with respective reliability data that transgress the threshold and the one or more dummy WLs.

2. The system of claim 1, wherein the reliability data comprises an error rate associated with the set of main WLs of the block.

3. The system of claim 2, wherein the threshold represents a tolerable error rate.

4. The system of claim 1, wherein determining that the one or more WLs are associated with respective reliability data that transgress the threshold comprises determining that the one or more WLs fail a verify stage of a programming cycle.

5. The system of claim 4, wherein the one or more WLs correspond to defective WLs.

6. The system of claim 1, wherein the one or more dummy WLs are selected from a group of WLs that are initially unmapped within any blocks of the set of memory components during manufacture of the memory sub-system.

7. The system of claim 6, wherein the one or more dummy WLs are physically positioned at a top portion, bottom portion, edge portion, or center interface portion of the memory sub-system.

8. The system of claim 1, the operations comprising:
determining that a quantity of program-erase cycles of the one or more WLs corresponds to a criterion; and
in response to determining that the quantity of program-erase cycles of the one or more WLs corresponds to the criterion, programming the data to the block using the one or more WLs.

9. The system of claim 8, the operations comprising:
in response to determining that the quantity of program-erase cycles of the one or more WLs fail to correspond to the criterion, programming the data to the block using the one or more dummy WLs.

10. The system of claim 8, wherein the criterion comprises at least one of:
an even number WL;
an odd number WL;
a threshold quantity of program cycles being performed;
an elapsed time of use;
a reliability threshold being reached; or
a specified quantity of program-erase cycles being reached.

11. The system of claim 1, wherein the block corresponds to a single level cell block.

12. The system of claim 1, the operations comprising:
updating a page map that identifies WLs of the block to include the one or more dummy WLs.

13. The system of claim 12, wherein the page map corresponds to a single level cell (SLC) page map, the operations comprising:
updating a quad level cell (QLC) block table corresponding to the SLC page map.

14. The system of claim 13, the operations comprising:
combining a remaining portion of the set of main WLs for which the respective reliability data fail to transgress the threshold to form an individual SLC block; and
generating a QLC block that includes a plurality of SLC blocks comprising the individual SLC block.

15. The system of claim 14, the operations comprising:
determining that the QLC block is incompletely filled by the plurality of SLC blocks in response to determining that the individual SLC block includes a quantity of WLs that is fewer than a total number of WLs in the set of main WLs.

16. The system of claim 15, the operations comprising:
in response to determining that the QLC block is incompletely filled, identifying one or more WLs of an additional SLC block to include in the QLC block.

17. The system of claim 16, the operations comprising:
determining that the QLC block is incompletely filled by the plurality of SLC blocks in response to determining that the individual SLC block includes a quantity of WLs that is fewer than a total number of WLs in the set of main WLs; and
in response to determining that the QLC block is incompletely filled, adding dummy data to incompletely filled portions of the QLC block.

18. A method comprising:
accessing reliability data of a set of main word lines (WLs) of a block of a set of memory components;
determining that one or more WLs of the set of main WLs of the block are associated with respective reliability data that transgress a threshold;
in response to determining that the one or more WLs are associated with the respective reliability data that transgress the threshold, replacing the one or more WLs of the set of main WLs of the block with one or more dummy WLs; and
alternatively cycling between programming data to the block using the one or more WLs that are associated with respective reliability data that transgress the threshold and the one or more dummy WLs.

19. A non-transitory computer-readable storage medium comprising instructions that, when executed by a processing device, cause the processing device to perform operations comprising:
accessing reliability data of a set of main word lines (WLs) of a block of a set of memory components;
determining that one or more WLs of the set of main WLs of the block are associated with respective reliability data that transgress a threshold;
in response to determining that the one or more WLs are associated with the respective reliability data that transgress the threshold, replacing the one or more WLs of the set of main WLs of the block with one or more dummy WLs; and
alternatively cycling between programming data to the block using the one or more WLs that are associated with respective reliability data that transgress the threshold and the one or more dummy WLs.

20. The non-transitory computer-readable storage medium of claim 19, the operations comprising:
combining a portion of the set of main WLs for which the respective reliability data fail to transgress the threshold to form an individual SLC block; and
generating a QLC block that includes a plurality of SLC blocks comprising the individual SLC block.

* * * * *